US007693118B2

(12) United States Patent
Cosovic et al.

(10) Patent No.: US 7,693,118 B2
(45) Date of Patent: Apr. 6, 2010

(54) METHOD FOR SPECTRAL SIDE LOBE SUPPRESSION IN OFDM-BASED COMMUNICATION SYSTEMS

(75) Inventors: Ivan Cosovic, München (DE); Sinja Brandes, Neufahrn (DE); Michael Schnell, Gilching (DE)

(73) Assignee: Deutsches Zentrum für Luft- und Raumfahrt e. V., Bonn (DE)

( * ) Notice: Subject to any disclaimer, the term of this patent is extended or adjusted under 35 U.S.C. 154(b) by 1211 days.

(21) Appl. No.: 11/248,473

(22) Filed: Oct. 12, 2005

(65) Prior Publication Data

US 2006/0133261 A1 Jun. 22, 2006

(30) Foreign Application Priority Data

Oct. 12, 2004 (DE) ............... 10 2004 049 803

(51) Int. Cl.
*H04W 4/00* (2009.01)
(52) U.S. Cl. ............... 370/338; 370/328; 455/403; 455/423; 455/427
(58) Field of Classification Search ............ 370/338, 370/328; 455/403, 427, 423
See application file for complete search history.

(56) References Cited

U.S. PATENT DOCUMENTS

| 6,035,000 | A | 3/2000 | Bingham |
| 6,424,681 | B1 | 7/2002 | Tellado et al. |
| 6,512,797 | B1 | 1/2003 | Tellado et al. |
| 7,411,897 | B2 * | 8/2008 | Yoo et al. ............ 370/208 |
| 2002/0105901 | A1 | 8/2002 | Chini et al. |
| 2003/0203717 | A1 | 10/2003 | Chuprun et al. |
| 2004/0066283 | A1 | 4/2004 | Manis et al. |
| 2004/0114507 | A1 | 6/2004 | Yoo et al. |
| 2004/0141548 | A1 | 7/2004 | Shattil |
| 2004/0162097 | A1 | 8/2004 | Vijayan et al. |
| 2004/0264508 | A1 | 12/2004 | Henkel et al. |
| 2005/0047535 | A1 | 3/2005 | Ahmed et al. |
| 2007/0060058 | A1 | 3/2007 | Shattil |

FOREIGN PATENT DOCUMENTS

| CA | 2 356 183 | 6/2000 |
| EP | 0 725 510 | 8/1996 |
| EP | 1 161 025 | 12/2001 |
| EP | 1 422 897 | 5/2004 |
| EP | 1 450 506 | 8/2004 |
| WO | WO 97/40609 | 10/1997 |
| WO | WO 00/38386 | 6/2000 |

(Continued)

OTHER PUBLICATIONS

Proakis, J.G.: "Digital Communications," New York:McGraw-Hill Inc., 1995 (synopsis to follow).
van Nee, R.; Prasad, R: "OFDM for Wireless Multimedia Communications," Boston: Artech House, 2000 (synopsis to follow).

(Continued)

*Primary Examiner*—Nghi H Ly
(74) *Attorney, Agent, or Firm*—Collard & Roe, P.C.

(57) ABSTRACT

The subcarriers in an OFDM communication system or OFDM-based multicarrier communication system are multiplied with weighting factors, determined so that in accordance with an optimization criterion the side lobes are minimized in a determined frequency domain. In determining the weighting factors constraints can be taken into account to further boost system power output.

25 Claims, 2 Drawing Sheets

FOREIGN PATENT DOCUMENTS

| WO | WO 03/026240 | 3/2003 |
|----|--------------|--------|
| WO | WO 03/063459 | 7/2003 |
| WO | WO 2004/105336 | 12/2004 |

OTHER PUBLICATIONS

Proakis, J.G.: "Digital Communications," New York:McGraw-Hill Inc., 1995, pp. 556-561.

van Nee, R.; Prasad, R: "OFDM for Wireless Multimedia Communications," Boston: Artech House, 2000, pp. 42-45.

Yoo, H. et al., "Edge Sidelobe Suppressor Scheme for OFDMA Uplink Systems," IEEE Communications Letters, IEEE Service Center, Piscataway, NJ, Bd. 7, No. 11, Nov. 2003, pp. 534-536. XP-001185628.

Brandes, S. et al., "Reduction of out-of-band radiation in OFDM based overlay systems," New Frontiers in Dynamic Spectrum Access Networks, 2005, Dyspan 2005, First IEEE International Symposium on Baltimore, MD, Nov. 2005, Piscataway, NJ, pp. 662-665. XP-010855171.

Brandes, S. et al., "Sidelobe supression in OFDM systems by insertion of cancellation carriers," Vehicular Technology Conference 2005, VTC-2005-FALL-2005 IEEE $62^{nd}$ Dallas, TX, Sep. 2005, Piscataway, NJ, pp. 152-156. XP-010878440.

Baldemair, R., "Suppression of narrow frequency bands in multicarrier transmission systems," Eusipco—Proceedings of the X European Signal Processing Conference, Finland, Sep. 4, 2000, pp. 553-556, XP 002372892.

\* cited by examiner

METHOD FOR SPECTRAL SIDE LOBE SUPPRESSION IN OFDM-BASED COMMUNICATION SYSTEMS

FIELD OF THE INVENTION

The invention relates to a method for spectral side lobe suppression of the transmitter signal in wireless or wired orthogonal frequency-division multiplexing (OFDM) communication systems and in OFDM or OFDM-based multicarrier communication systems.

PRIOR ART

The spectrum of an OFDM transmission signal is known to comprise strong side lobes. This means that in OFDM communication considerable spurious transmission is radiated outside of the communication bandwidth.

Various possibilities exist in prior art for spectral side lobe suppression in OFDM.

Spectral side lobes can be particularly suppressed by filtering. This, however, means, for one thing, additional design complications and thus added costs. For another, the transmission signal is influenced by the filtering and interference can occur. More particularly, due to filtering the OFDM symbol is elongated in the time domain, as a result of which the nuisance of symbol interference may materialize between OFDM symbols in sequence.

Spectral side lobe suppression can also be achieved in OFDM communication systems by providing large guard bands to neighboring systems in the frequency domain or subcarriers left free at the edge of the frequency domain of the OFDM communication system. The method of leaving subcarriers free at the edge of the frequency domain, i.e. with no assignment of data symbols, is used, for example, in digital audio broadcasting (DAB) and digital video broadcasting—terrestial (DVB-T) standards. These known measures are, however, inefficient and waste the valuable spectrum resource. When only a small frequency domain is available for communication there is no sense in placing an OFDM communication system in this frequency domain when large guard bands are to be provided or sub-bands need to be left free.

Spectral side lobe suppression can also be achieved in OFDM communication systems by pulse shaping. Instead, of the square pulse for the OFDM symbol in the time domain other pulse shapes can be selected which have a more favorable spectrum, i.e. a spectrum whose side lobes fade out faster. Examples of such pulses are Nyquist pulses such as, for example, the raised cosine pulse. But other pulse shapes other than the square pulse are also hampered by drawbacks, namely by the spread of the OFDM symbol with time which may result in symbol interference. Apart from this, this no longer permits use for OFDM modulation and demodulation the uncomplicated achievement by means of discrete Fourier transformation (DFT)/inverse discrete Fourier transformation (IDFT) or fast Fourier transformation (FFT)/inverse fast Fourier transformation (IFFT).

Prior art spectral side lobe suppression in OFDM communication systems as described above is based on textbook knowledge for reference, for example, from the book by Proakis, J. G,: "Digital Communications", New York: McGraw-Hill Inc., 1995 or the book by van Nee, R; Prasad, R: "OFDM for Wireless Multimedia Communications", Boston: Artech House, 2000.

In some OFDM communication systems there is a need to make use of small frequency domains, as is the case, for example, in the concept of OFDM-based overlay communication systems. An overlay communication system is one which works in the spectrum of another communication system where it is permitted to use the idle frequency domains therein for communication.

SUMMARY OF THE INVENTION

The present invention is based on the object of suppressing or at least substantially reducing spectral side lobes in OFDM communication systems and in OFDM or OFDM-based multicarrier communication systems without requiring any additional complicated filtering and without the OFDM transmission signal being influenced by filtering causing interference, particularly symbol interference. In addition, it is also the intention in spectral side lobe suppression in accordance with the present invention to fully exploit the valuable spectrum resource without waste which is particularly of major importance when only a small frequency domain is available for communication.

In accordance with the present invention relating to a method for spectral side lobe suppression in OFDM communication systems and in OFDM or OFDM-based multicarrier communication systems of the aforementioned kind this object is achieved to advantage by the subcarriers in the OFDM or OFDM-based multi-carrier communication system being multiplied with real or complex weighting factors determined so that in accordance with an optimization criterion the spectral side lobes are minimized.

Side lobe suppression in OFDM systems and OFDM-based multi-carrier communication systems is thus achieved in accordance with the present invention by weighting the subcarriers, the weighting factors being determined in accordance with an optimization criterion so that the side lobes are minimized.

The weighting factors of the subcarriers can be restricted advantageously by determined constraints. Thus, for example, it can be assured that because of the weighting the power that needs to be invested is not more that for the original communication system. It can further be assured that each subcarrier is communicated with a determined minimum power. When the weighting factors are restricted to real and positive values, the receiver in the communication system requires no information as to the weighting factors. By combining the optimization criterion with a plurality of constraints the power output of the system can be further increased.

As compared to prior art the method in accordance with the present invention excels by a number of advantages. Neither symbol interference nor any other interference is generated. Only very small guard bands are now needed. DFT/IDFT or FFT/IFFT can continue to be used for OFDM modulation and demodulation.

The sole drawback of the method in accordance with the present invention is that the error probability may slightly increase for symbols communicated by subcarriers having been allocated small weighting factors.

Advantageous aspects, further embodiments and uses of the method in accordance with the present invention for spectral side lobe suppression of the transmitter signal in wireless or wired OFDM communication systems and in OFDM or OFDM-based multicarrier communication systems read from the sub-claims relating back to claim 1 directly or indirectly.

DESCRIPTION OF THE DRAWINGS

For a better understanding the present invention will now be explained by way of a relatively simple example embodiment with reference to the attached drawings in which.

Considered is an OFDM communication system having N=8 subcarriers and binary phase shift keying (BPSK) modulation. BPSK means that binary communication symbols $d_n$, n=1, ..., N are transmitted, i.e. $d_n \in \{+1,-1\}$. The duration of a BPSK symbol is termed $T_s$. Since an OFDM symbol simultaneously communicates N BPSK symbols, the duration of an OFDM symbol is $T=N \cdot T_s$. The subcarriers in the OFDM communication system are numbered in sequence from left to right, in other words with increasing center frequency, the subcarrier at left-hand edge being denoted with 1 and its center frequency with $f_1$ and the subcarrier at the right-hand edge with N and its center frequency with $f_N$. The subcarriers in the following are termed $s_n(x)$, n=1, ..., N, and can be represented in accordance with $$s_n(x) = d_n \cdot \frac{\sin(x - x_n)}{x - x_n}, n = 1, \ldots, N \tag{1}$$

where $x=fT/\pi$ signifies the scaled frequency and $x_n=f_n T/\pi$ the scaled center frequency of the subcarrier n. Every subcarrier $s_n(x)$ is provided with a weighting factor $g_n$ resulting in the weighted subcarriers $\bar{s}_n(x)$ $$\bar{s}_n(x) = g_n \cdot s_n(x) = g_n \cdot d_n \cdot \frac{\sin(x - x_n)}{x - x_n}, n = 1, \ldots, N. \tag{2}$$

Furthermore, as an example, the symbol sequence $\{d_1, \ldots, d_N\}=\{+1,-1\}$ is selected for the BPSK communication under consideration.

Figure 1:
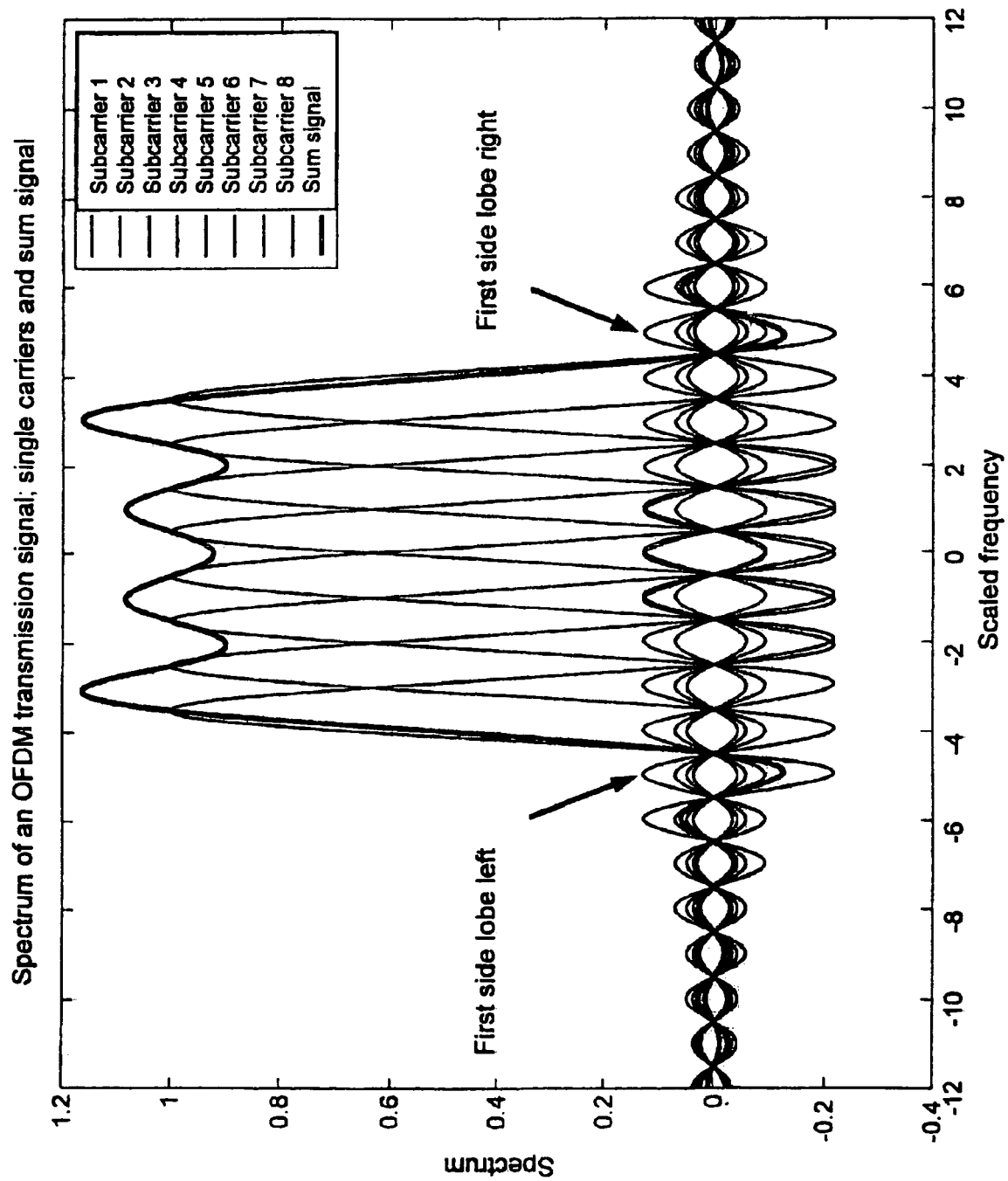
FIG. 1 is a graph plotting the spectrum of a usual OFDM transmission signal with subcarrier spectra as well as the spectrum of the summation signal for an OFDM communication system with eight subcarriers.

Referring now to FIG. 1 there is illustrated the spectrum of the single carriers (broken line) and the spectrum of the summation signal (bold line) for an OFDM communication with N=8 subcarriers without use of weighting factors. In this example the first side lobe is in the positive range of the scaled frequency $x=fT/\pi$ between $x=4.5$ and $x=5.5$. Correspondingly, the negative range of the scaled frequency is $x=fT/\pi$, the first side lobe in this case being between $x=5.5$ and $x=-4.5$. All side lobes have the same scaled width $\Delta x=1$ in the frequency domain. The amplitude of the side lobes decreases with increasing |x|.

Figure 2:
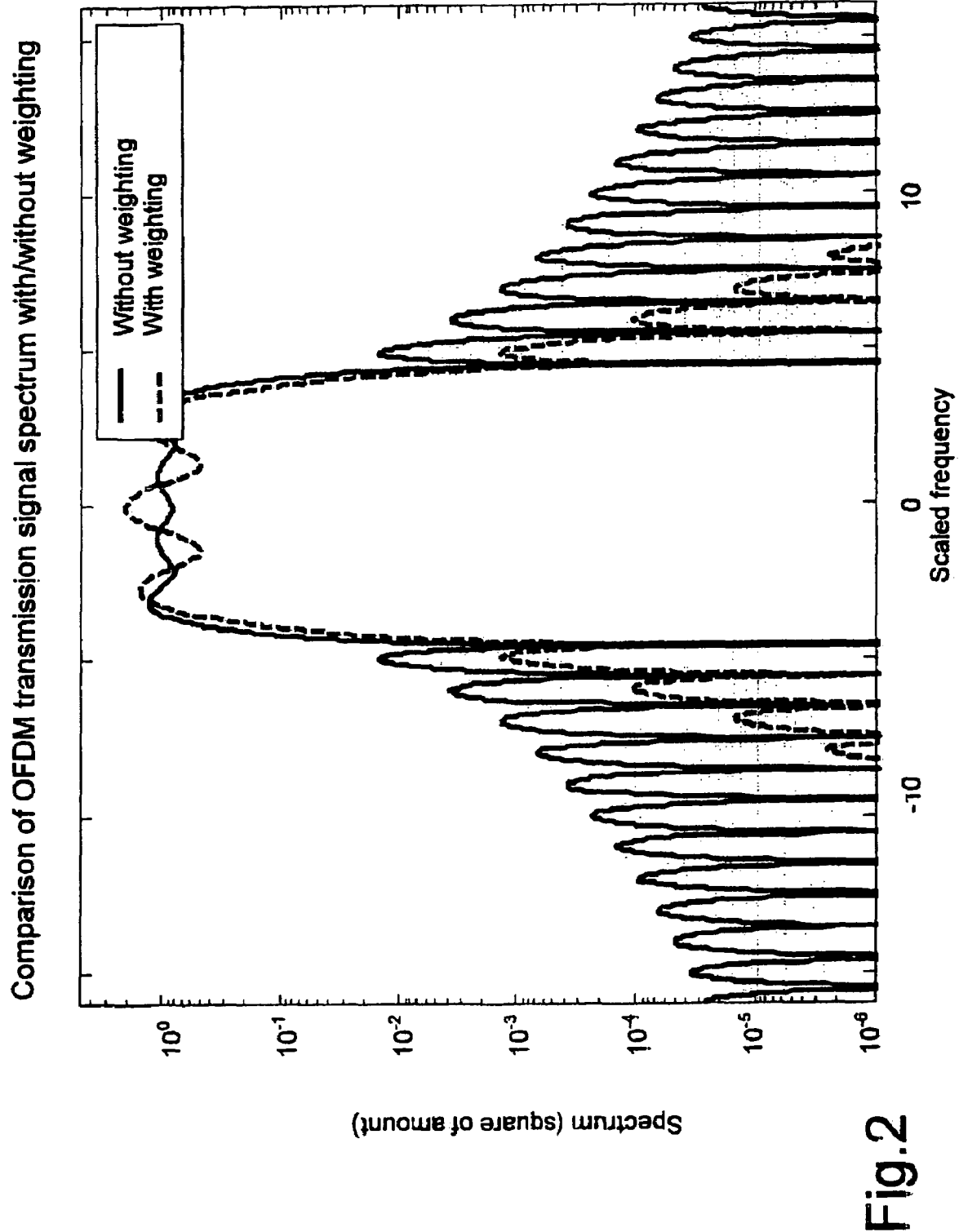
FIG. 2 is a graph plotting the power density spectra of the OFDM transmission signal without weighting factors and with weighting factors on a logarithmic scale.

Referring now to FIG. 2 there is illustrated the power density spectra of the OFDM transmission signal without weighting factors (bold lines) and of the OFDM transmission signal with weighting factors (broken lines) in comparison on a logarithmic scale for a better appreciation of side lobe suppression as achieved by the method in accordance with the present invention. In the example under consideration a side lobe suppression of better than 10 dB is achieved. In addition to this fade out of the side lobes of the OFDM transmission signal is substantially faster with weighting factors than side lobes of the OFDM transmission signal without weighting factors.

After having demonstrated that introducing weighting factors can result in substantial side lobe suppression it will now be explained how the weighting factors can be suitably determined to achieve optimum spectral side lobe suppression.

To determine the weighting factors $g_n$, n=1, ..., N, an optimization criterion is used, for which in the present example the square of the sum of the transmission signal is minimized for a number of side lobes or bandwidth as determined. For the sake of simplicity the range of the first side lobes outside of the communication bandwidth is selected as an example for optimizing $$\int_{-5.5}^{-4.5} \left| \sum_{n=1}^{N} \bar{s}_n(x) \right|^2 dx \to \min \tag{3}$$

$$\int_{4.5}^{5.5} \left| \sum_{n=1}^{N} \bar{s}_n(x) \right|^2 dx \to \min \tag{4}$$

Further constraints can be taken into account in the calculation. For example, it can be required that all weighting factors are real-valved and must lie within a determined range, namely $$g_{min} < g_n < g_{max}, n=1, \ldots, N, \tag{5}$$

defined by a lower limit $g_{min}$ and an upper limit $g_{max}$. As a further constraint it can further be required that the total power transmitted must not change by the weighting $$\sum_{n=1}^{N} |d_n|^2 = \sum_{n=1}^{N} |g_n d_n|^2 \tag{6}$$

Equations (3) and (4) with the constraints (5) and/or (6) can be solved for example by means of the least squares fit with linear constraints. This is a known mathematical problem, the solution of which is to be found in relevant literature, for example in P. E. Gill, W. Murray, and M H. H. Wright: "Practical Optimization", Academic Press, London UK, 1981.

The method in accordance with the present invention is not restricted to the example embodiment as described above, but can be generalized for the following applications:

The method in accordance with the present invention is not only applicable to OFDM communication systems but to all communication methods based on OFDM such as, for example, orthogonal frequency division multiple access (OFDMA) and multi-carrier code division multiple access (MC-CDMA).

The method in accordance with the present invention is applicable to OFDM systems or OFDM-based multi-carrier communication systems with any number N of subcarriers.

The method in accordance with the present invention is applicable to OFDM systems or OFDM-based multi-carrier communication systems in which part of the subcarriers, as determined, is kept free, such as for example in the reverse link of OFDM.

The method in accordance with the present invention is not restricted to weighting of all subcarriers. Instead, also only a determined number of subcarriers may be weighted.

The method in accordance with the present invention is not restricted to weighting of the subcarriers for data communication. Instead, also other subcarriers can be weighted which, for example, are used for communicating pilot and/or synchronisation symbols.

The method in accordance with the present invention is not restricted to BPSK, but can be extended to all methods of modulation used in OFDM communication systems or OFDM-based multi-carrier communication systems.

The method in accordance with the present invention is not restricted to use of real weighting factors. Instead, the weighting factors may also be generally complex as a function of the modulation scheme and/or the constraints.

The method in accordance with the present invention is not restricted to suppression of one side lobe each at both edges of the transmission signal spectrum. Instead, optimizing the weighting factors can be extended to any bandwidth.

The method in accordance with the present invention is not restricted to use of the optimization criterion "minimizing the square of the sum of the transmission signal for a determined number of side lobes".

The method in accordance with the present invention is not restricted to use of the cited constraints for optimizing. Instead, some or all of the cited constraints can be omitted and new constraints incorporated.

The method in accordance with the present invention is not restricted to use of the least squares fit to taken into account the constraints. Instead, other methods can be used to take into account the constraints.

The method in accordance with the present invention is not restricted to weighting the signal in the frequency domain. Instead, weighting can also be put to use in the time domain.

The method in accordance with the present invention can be combined simply with other methods for side lobe suppression, for example with the three prior art methods as discussed in the background description. This is possible since the method in accordance with the present invention requires no basic changes to the OFDM communication system or OFDM-based multi-carrier communication system.

The method in accordance with the present invention can be put to use in all OFDM-based wired multi-carrier communication systems to achieve therein spectral side lobe suppression. In conjunction with wired communication, OFDM is often also termed discrete multi-tone (DMT) modulation. OFDM or DMT is often used as the digital link in last mile wired communication. The various communication techniques existing for this purpose come under the heading digital subscriber line (DSL). DSL communication techniques are, for example, high-speed HDSL, asymmetric (ADSL) and symmetric (SDSL) all of which are examples for application of the gist of the present invention in the scope of wired communication. Furthermore, the method in accordance with the present invention can be put to use for OFDM systems in the scope of power line communication.

The method in accordance with the present invention can be put to use in all OFDM-based wireless communication systems to achieve therein spectral side lobe suppression. Application in this case covers both already standardized OFDM-based systems such as for example DAB, DVB-T, WLAN in accordance with HIPERLAN/2 or IEEE 802.11a/b/g or metropolitan area network (MAN) in accordance with IEEE 802.16/802.16a standards as well as new systems such as for example OFDM-based MC-CDMA developments in the scope of fourth generation (4G) mobile radio.

The method in accordance with the present invention also finds highly interesting application in conjunction with so-called OFDM-based overlay systems. An overlay system is a communication system (filler system) which works in the frequency band of another communication system (main system) where it uses the idle frequency gaps. Systems particularly suitable for overlay applications are OFDM-based systems since these by deactivating individual subcarrier groups can leave free domains in the spectrum in which the main system is communicating at the time. However, the strong side lobes of a standard OFDM method would either interfere with the main system or make it necessary to use large guard bands or steep transmission filters. Thus, it is side lobe suppression in accordance with the present invention that now makes an efficient achievement of overlay systems possible for the first time.

The method in accordance with the present invention thus makes it possible to eliminate additional filtering or pulse shaping of the transmission signal whilst permitting the use of smaller guard bands, Furthermore, the method in accordance with the present invention permits achievement of efficient OFDM-based overlay systems as more recent R&D products for better utilization of the valuable resource spectrum. The potential range of application for overlay systems extends from terrestrial to aerospace and satellite communication. At this time e.g. work is going on in an EU project in the $6^{th}$ Framework Program in developing an overlay system for future air traffic control (ATC) communication in the VHF band.

The invention claimed is:

1. A method for spectral side lobe suppression of the transmitter signal in wireless or wired orthogonal frequency-division multiplexing (OFDM) communication systems and in OFDM or OFDM-based multicarrier communication systems, wherein each subcarrier in the OFDM or OFDM-based multi-carrier communication system is multiplied with real or complex weighting factors, each weighted subcarrier being determined according to $$\tilde{s}_n(x) = g_n \cdot s_n(x) = g_n \cdot d_n \cdot \frac{\sin(x - x_n)}{x - x_n}, n = 1, \ldots, N.$$

each weighting factor $g_n$ being determined for each OFDM symbol sequence separately so that in accordance with an optimization criterion the spectral side lobes of each OFDM symbol sequence of an OFDM transmission of the communication system are minimized.

2. The method as set forth in claim 1, wherein in determining the weighting factors one or more constraints are taken into account.

3. The method as set forth in claim 2, wherein a constraint involves the assurance that in weighting the subcarriers not more power needs to be invested than for the original communication system without weighting.

4. The method as set forth in claim 2, wherein a constraint involves each subcarrier being communicated with a determined minimum power.

5. The method as set forth in claim 1, wherein the weighting factors of the subcarriers can be complex selected as a function of the modulation scheme in each case and/or the constraints.

6. The method as set forth in claim 1, comprising use of a modulation method such as for example BPSK, QPSK or QAM compatible with OFDM communication systems or OFDM-based multi-carrier communication systems.

7. The method as set forth in claim 6, wherein binary phase shift keying (BPSK) is used as the modulation method.

8. The method as set forth in claim 1, wherein the optimization criterion requires the square of the sum of the transmission signal to be minimized for a determined number of spectral side lobes.

9. The method as set forth in claim 8, wherein the square of the sum of the transmission signal is minimized for the first side lobe on both sides outside of the communication bandwidth.

10. The method as set forth in claim 1, wherein the optimization criterion requires the square of the sum of the transmission signal to be minimized over a determined bandwidth.

11. The method as set forth in claim 2, wherein for taken into account the constraints the least squares fit is used.

12. The method as set forth in claim 1, comprising weighting of the transmission signal in the frequency domain.

13. The method as set forth in claim 1, comprising weighting of the transmission signal in the time domain.

14. The method as set forth in claim 1, wherein a determined part of the subcarriers is left free, such as, for example, in the reverse link of OFDM.

15. The method as set forth in claim 1, comprising a combination of one or more methods for spectral side lobe suppression in the corresponding OFDM communication system or OFDM or OFDM-based multi-carrier communication system.

16. Use of the method as set forth in claim 1 for an OFDM-based wired communication system for achieving spectral side lobe suppression.

17. The use as set forth in claim 16 in the scope of the last mile digital link in accordance with any of the various digital subscriber line (DSL) communication techniques.

18. The use as set forth in claim 16 in the scope of an OFDM power line communication system.

19. The use of the method as set forth in claim 1 for OFDM-based wireless communication systems for achieving spectral side lobe suppression.

20. The use as set forth in claim 19 in the scope of an already standardized OFDM-based system such as, for example DAB, DVB-T, WLAN in accordance with HIPERLAN/2 or IEEE 802.11a/b/g or metropolitan area network (MAN) in accordance with IEEE 802.16/802.16a standards.

21. The use as set forth in claim 19 in the scope of an OFDM-based MC-CDMA communication system in the scope of fourth generation (4G) mobile radio.

22. The use of the method as set forth in claim 1 in conjunction with an OFDM-based overlay communication system, i.e. a communication system working as a filler system in the frequency band of another communication system operated as the main system where it uses the existing idle frequency gaps.

23. The use as set forth in claim 22 in the scope of a terrestial radio communication system.

24. The use as set forth in claim 22 in the scope of an aerospace communication system.

25. The use as set forth in claim 22 in the scope of a satellite communication system.

* * * * *